United States Patent [19]
Cepelinski

[11] 4,204,094
[45] May 20, 1980

[54] TONE APPLYING LINE CIRCUIT

[75] Inventor: Jacob Cepelinski, Ottawa, Canada

[73] Assignee: Mitel Corporation, Canada

[21] Appl. No.: 933,538

[22] Filed: Aug. 14, 1978

[30] Foreign Application Priority Data

May 24, 1978 [CA] Canada .................................. 303989

[51] Int. Cl.² ............................................. H04Q 1/44
[52] U.S. Cl. ................................................ 179/18 FA
[58] Field of Search .............. 179/18 FA, 18 F, 84 A, 179/84 T, 84 VF, 16 AA, 16 C, 18 FH, 99, 18 BG

[56] References Cited

U.S. PATENT DOCUMENTS

| | | | |
|---|---|---|---|
| 2,966,556 | 12/1960 | Hofmann | 179/18 FA X |
| 3,250,858 | 5/1966 | McDermott et al. | 179/18 F |
| 3,385,935 | 5/1968 | Anderson et al. | 179/99 |
| 3,862,374 | 1/1975 | Evers | 179/18 FH |
| 4,011,413 | 3/1977 | Phillips | 179/99 X |

*Primary Examiner*—Thomas W. Brown
*Attorney, Agent, or Firm*—Craig and Antonelli

[57] ABSTRACT

A circuit for efficiently applying tones or other signals to a line circuit which has a variety of conditions such as being split from the central office, and having a telephone set connected thereto either on hook or off hook. The invention is comprised of a tip lead and a ring lead having one end for connection to a central office and another end for connection to a subscriber's telephone set. A low impedance signal source including line current conducting means is connected in series with the tip or ring lead. A switchable resistance is provided for connecting a circuit path between the tip and ring leads at the telephone set end of the tip and ring lead. Preferably the low impedance signal source including the line current conducting means has a resistance which is 25% or less than the off hook impedance of the telephone set.

8 Claims, 1 Drawing Figure

U.S. Patent
May 20, 1980
4,204,094
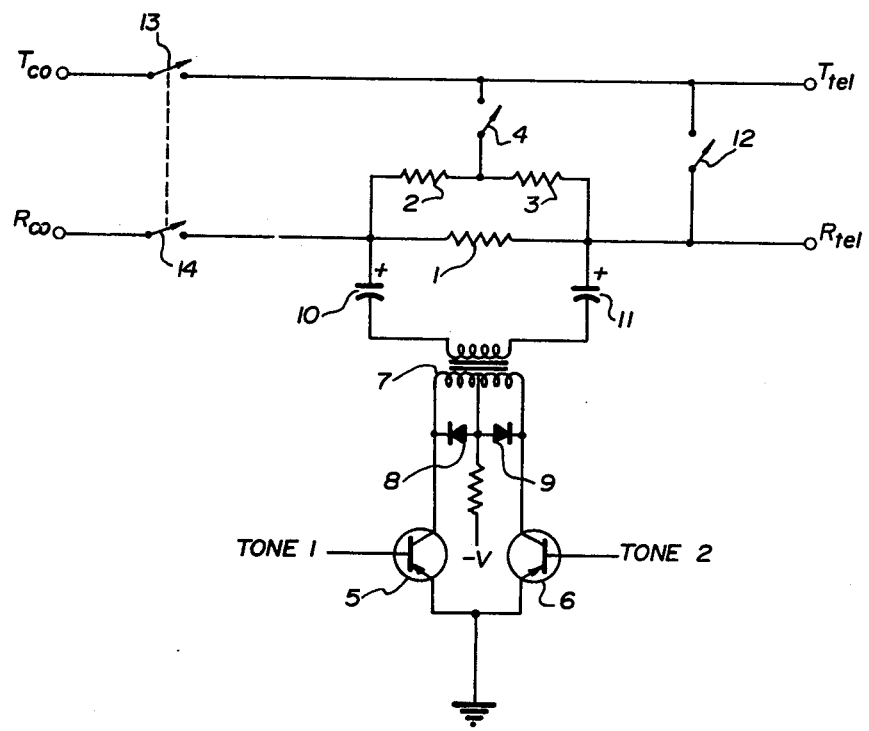

TONE APPLYING LINE CIRCUIT

This invention relates to a circuit for applying tones or the like to a telephone line.

Certain types of subscriber's telephone lines require tone signals to be applied at various times. The tone signals in some cases must be applied to lines which can be split or open-circuited from the central office, and which have a telephone set sometimes connected (i.e. off-hook) and sometimes disconnected (i.e. on-hook). It is often difficult to decide whether to optimize the tone signal source output circuit to meet the impedance and tone amplitude requirement of the off-hook condition, the on-hook condition, the split or the not-split condition of the telephone line.

Further, the tones must sometimes be sent only to the telephone set or only to the central office. When being sent to the central office with the telephone set off-hook, signals from the telephone set may interfere with the tones or may be received at the central office, as a false tones. Clearly these conditions compound the impedance matching, tone application and switching problems if efficient and optimum performance is desired.

The present invention is a circuit by which tones may be applied efficiently to the telephone line in any of the above conditions. The tone can be applied for transmission to the off-hook telephone set, or to the central office while the telephone set is either on or off-hook in the event the line is not split. In this respect the circuit is particularly useful as means for applying automatic number identification (ANI) or other signalling tones from a subscriber's line to the central office. Further, means is provided for avoiding the transmission of interfering signals from the telephone set to the central office during tone application.

The invention, generally, is a line circuit comprising a tip lead and a ring lead having one end for connection to a central office and another end for connection to a subscriber's telephone set, a low impedance signal source including line current conducting means connected in series with tip or ring lead, and switchable impedance means for connecting a circuit path between the tip and ring leads at the other end thereof.

Preferably the low impedance means is comprised of a first resistor in series with either the tip or ring lead having resistance of about 25% or less than the off-hook telephone set impedance, with a low impedance output circuit of an amplifier connected in parallel therewith. A pair of resistors in series, each of about double the resistance of the off-hook telephone set impedance is connected in parallel with the aforenoted resistor. A switch is connected between the junction of the pair of resistors and the other of the tip or ring lead.

As a result, the subscriber's line appears properly terminated (when the aforenoted switch is closed) when viewed from the telephone set and the central office when the line is not split yet is a closed, properly terminated circuit when viewed from the telephone set when the line is split. Accordingly a closed circuit for application of tones to the line from the amplifier is present should the line be either split or not split.

A better understanding of the invention will be obtained by reference to the detailed description below and to the single schematic drawing of the preferred embodiment of the invention.

Turning now to the FIGURE, a tip and ring lead is shown, one end for connection to a subscriber's telephone set $R_{tel}$ and $T_{tel}$, and the other end for connection to a central office $R_{co}$ and $T_{co}$.

Connected in series with one of the leads, for instance $R_{tel}$ and $R_{co}$ is a series resistor 1. A series pair of resistors 2 and 3 is connected in parallel with resistor 1, and a switching means such as switch 4 is connected between the junction of resistors 2 and 3 and the other of the tip or ring leads $T_{tel}$.

A tone source is connected in parallel with resistor 1. Preferably the tone source is comprised of an amplifier, the output of which is connected across resistor 1.

The specific tone source circuit shown is comprised of a push-pull amplifier having PNP transistors 5 and 6 which have their collectors connected to output transformer 7. A pair of diodes 8 and 9 are connected back to back across the primary of output transformer 7 as protection for the transistors. Diodes 8 and 9, while shown as ordinary diodes, can be zener diodes if preferred. The transformer can usefully be an output transformer having an 8 ohm secondary and a 20,000 ohm primary widing.

The secondary winding of output transformer 7 is connected through large valued (e.g. 100 microfarad) D.C. isolating capacitors 10 and 11. Two capacitors preferably are used to ensure that they will not become reverse polarized should the d.c. voltage applied from the central office to the tip and ring leads be reversed in polarity.

A switch 12 is connected between the tip and ring leads at the telephone set end of the tip and ring leads, $T_{tel}$ and $R_{tel}$.

It is preferred that the value of the resistance of resistor 1 should be small relative to the line impedance, preferably not greater than 25% thereof; one successful prototype circuit utilized a resistor of 39 ohms.

Resistors 2 and 3 are preferably each double the termination resistance, that is, the resistance of the off-hook telephone set. The resistances of each of resistors 2 and 3 preferably should be equal. In the aforenoted successful prototype, each resistor was 402 ohms.

Switches 4 and 12 can be make contacts of a pair of relays.

In operation, a push-pull signal comprising complementary signals TONE 1 and TONE 2 are applied through resistors 50 and 51 to the bases of transistors 5 and 6. At the same time, switch 4 is closed by a relay or other external means. The tone signal is applied via output transformer 7 to resistor 1 through capacitors 10 and 11.

Resistor 1 in parallel with resistors 2 and 3 provide a load to the aforenoted amplifier circuit. A voltage drop therefore appears across each of equal valued resistors 2 and 3. Accordingly, an equal voltage signal appears across each.

With switch 4 closed, signals of similar amplitude are applied across the leads $R_{tel}$ and $T_{tel}$, and $R_{co}$ and $T_{co}$ each side of resistor 1. Accordingly, similar amplitude signals are generated for application to the subscriber's telephone set and/or to the central office, whether the telephone set is on-hook or off-hook, whether the line is split or not split.

With the line split and the telephone set on-hook, resistors 1, 2, and 3 provide termination for the tone source circuit. With the line not split but the telephone set on-hook, resistor 1, 2, and 3 also provide termination for the central office, for direct current applied therefrom.

As a result, AC tone signal is applied to the subscriber's line from the tone source, while direct current applied to the subscriber's line from the central office passes through resistor 1 to the subscriber's telephone set with only a small reduction in voltage, or is terminated in resistors 1, 2 and 3 if the subscriber's telephone set is on hook.

As noted earlier the present circuit is useful in conjunction with apparatus which includes a line splitting circuit. As an example, switches 13 and 14 of such circuit are connected in series with the tip and ring leads adjacent the central office connections thereof. Switches 13 and 14 preferably are operated by a relay (not shown).

It should be noted that had resistors 2 and 3 and switch 4 not been present, the tone signal could not be applied to the telephone set with switches 13 and 14 open circuited. Should switches 13 and 14 have been closed, the signal would have been sent to the central office only with substantial decrease in amplitude due to line losses. Further, the signal could not be sent to the central office with the telephone set on-hook.

Had the tone application circuit been connected in parallel with the line, the amplitude of the tone would change substantially as switches 13 and 14 operate, and the telephone set go on or off-hook.

Accordingly, the present line circuit is an efficient means for applying ANI or other signalling tones to a telephone line which has a variety of operational conditions.

However with the telephone set off-hook, it is possible that signals generated thereat and appearing at terminals $T_{tel}$ and $R_{tel}$ would be received by the central office and would either interfere with or be mistaken for the tones. This could seriously distrupt central office operations since correct ANI tones are required to identify a number for billing of toll charges.

Switch 12 provides protection from the application of such signals to the central office from the subscriber's telephone set. In the event the tones are to sent only to the central office with the subscriber's telephone set off-hook, switch 12 is closed by external means such as a relay. This applies a short circuit across the telephone line, short circuiting signals generated at the telephone set from being applied across the telephone line. At the same time it short circuits tone signals from being applied to the telephone set, thus thwarting any attempt to record these signals at the telephone set.

A person skilled in understanding this invention may now conceive of various alternative structures and other embodiments using similar principles. All are considered within the scope and sphere of this invention as defined in the appended claims.

Embodiments of the invention in which exclusive property or privilege is requested are defined as follows:

1. In a line circuit comprising a tip lead and a ring lead adapted for connection between a central office and a subscriber's telephone set, a tone applying arrangement comprising a first resistor in series with either the tip or ring lead having resistance of about 25% or less than the off hook telephone set resistance, an amplifier having an output impedance which is low relative to the off hook telephone set impedance connected in parallel with the first resistor, a pair of resistors in series, each of about double the resistance of the off-hook telephone set impedance, connected in parallel with the first resistor, and a switch connected between the junction of the pair of resistors and the other of the tip or ring lead.

2. An arrangement as defined in claim 1, in which the resistance of each of the pair of resistors is the same.

3. An arrangement as defined in claim 2, in which the amplifier is the output stage of a tone generator.

4. An arrangement as defined in claim 3, in which the low impedance output circuit of the amplifier is comprised of an output transformer having its secondary winding connected across the first resistor.

5. An arrangement as defined in claim 2 or 4, further including means for closing the switch for allowing a tone which passes through the amplifier to be applied to the tip and ring lead.

6. An arrangement as defined in claim 2 or 3, further comprising switch means connected in series with both the tip and ring leads between the first resistor and the tip and ring lead connection to the central office.

7. An arrangement as defined in claim 1 or 4, further including a switch connected between the tip lead and ring lead at their ends which are adapted for connection to the subscriber's telephone set.

8. In a line circuit comprising a tip lead and a ring lead having one end for connection to a central office and another end for connection to a subscriber's telephone set, a tone applying arrangement comprising
a signal source having an output impedance which is low relative to the off-hook impedance of the subscriber's telephone set including line current conducting means connected in series with the tip or ring lead,
a pair of resistors connected in series across the low impedance source, and
a switch means connected between the junction of the pair of resistors and the other of the tip or ring lead.

* * * * *